United States Patent
Snedden

(10) Patent No.: US 6,846,459 B2
(45) Date of Patent: Jan. 25, 2005

(54) RESILIENT DISPERSING AMPULE AND PROCESS FOR FORMATION THEREOF

(76) Inventor: John Snedden, 1702 Industrial Dr., P. O. Box 1827, Sandpoint, ID (US) 83864

( * ) Notice: Subject to any disclaimer, the term of this patent is extended or adjusted under 35 U.S.C. 154(b) by 0 days.

(21) Appl. No.: 10/279,722

(22) Filed: Oct. 24, 2002

(65) Prior Publication Data

US 2003/0049179 A1 Mar. 13, 2003

Related U.S. Application Data

(63) Continuation-in-part of application No. 09/268,330, filed on Mar. 16, 1999, now abandoned.

(51) Int. Cl.$^7$ .................................................. B01L 3/02
(52) U.S. Cl. .......................... 422/100; 422/99; 422/102; 222/206; 222/209
(58) Field of Search ................................. 222/416, 420, 222/206, 209, 210; 422/99, 102, 56, 100; 604/1–3

(56) References Cited

U.S. PATENT DOCUMENTS

| | | | | |
|---|---|---|---|---|
| 3,373,238 A | * | 3/1968 | Powers, Jr. ................. | 264/322 |
| 3,917,120 A | * | 11/1975 | Larenz et al. ............... | 222/129 |
| 4,212,204 A | * | 7/1980 | St. Amand .................. | 73/425.6 |
| 4,563,104 A | * | 1/1986 | Saint-Amand ............... | 401/139 |
| 4,806,101 A | * | 2/1989 | Rossi ........................... | 433/92 |
| 5,073,347 A | * | 12/1991 | Garren et al. ................ | 422/100 |
| 5,102,398 A | * | 4/1992 | Farris .......................... | 604/212 |
| 5,320,257 A | * | 6/1994 | Snedden ...................... | 222/215 |
| 5,921,972 A | * | 7/1999 | Skow .......................... | 604/313 |
| D425,617 S | * | 5/2000 | Snedden ..................... | D24/115 |

* cited by examiner

*Primary Examiner*—Jill Warden
*Assistant Examiner*—Dwayne K Handy
(74) *Attorney, Agent, or Firm*—Keith S. Bergman

(57) ABSTRACT

A peripherally defined resilient ampule for storage and dispersement of encapsulated material provides a rearward cylinder-like reservoir body communicating through a transition element to a forwardly extending tapering spout defining a geometrically similar channel therethrough to a sealed tip to create an enclosed containment chamber. The forward portion of the spout may be angulated relative to the body axis. The ampule is formed of resiliently deformable thermal plastic that is configurationally sustaining, but manually deformable for expression of contained material. The spout may be severed at selected axial positions to determine orifice size and configuration and may carry ancillary dispersement devices. A forming process is disclosed to form the ampule from a molded blank of thermal plastic material by thermally activating and drawing the spout, optionally angulating the forward spout portion and sealing the forward spout end.

16 Claims, 2 Drawing Sheets

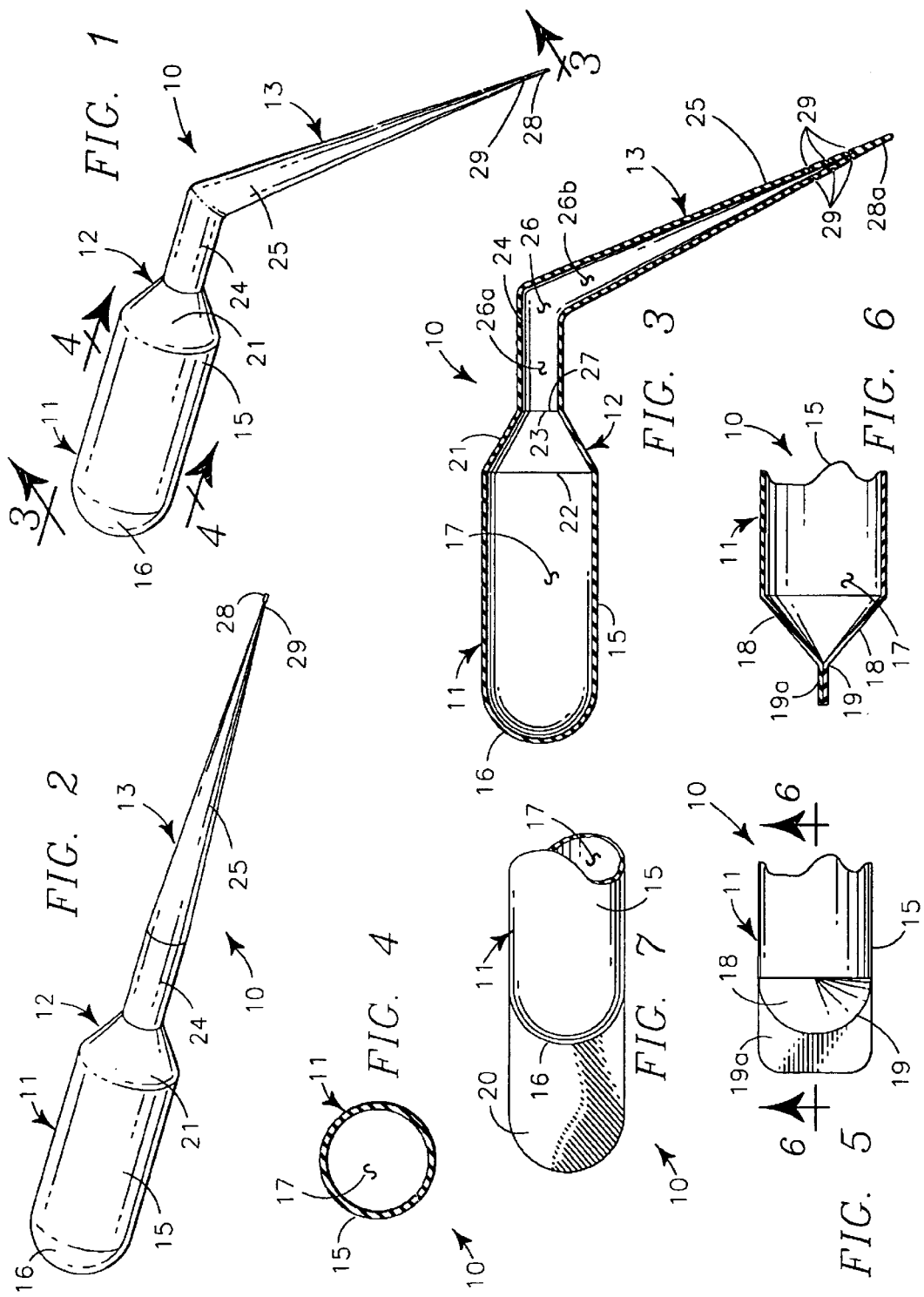

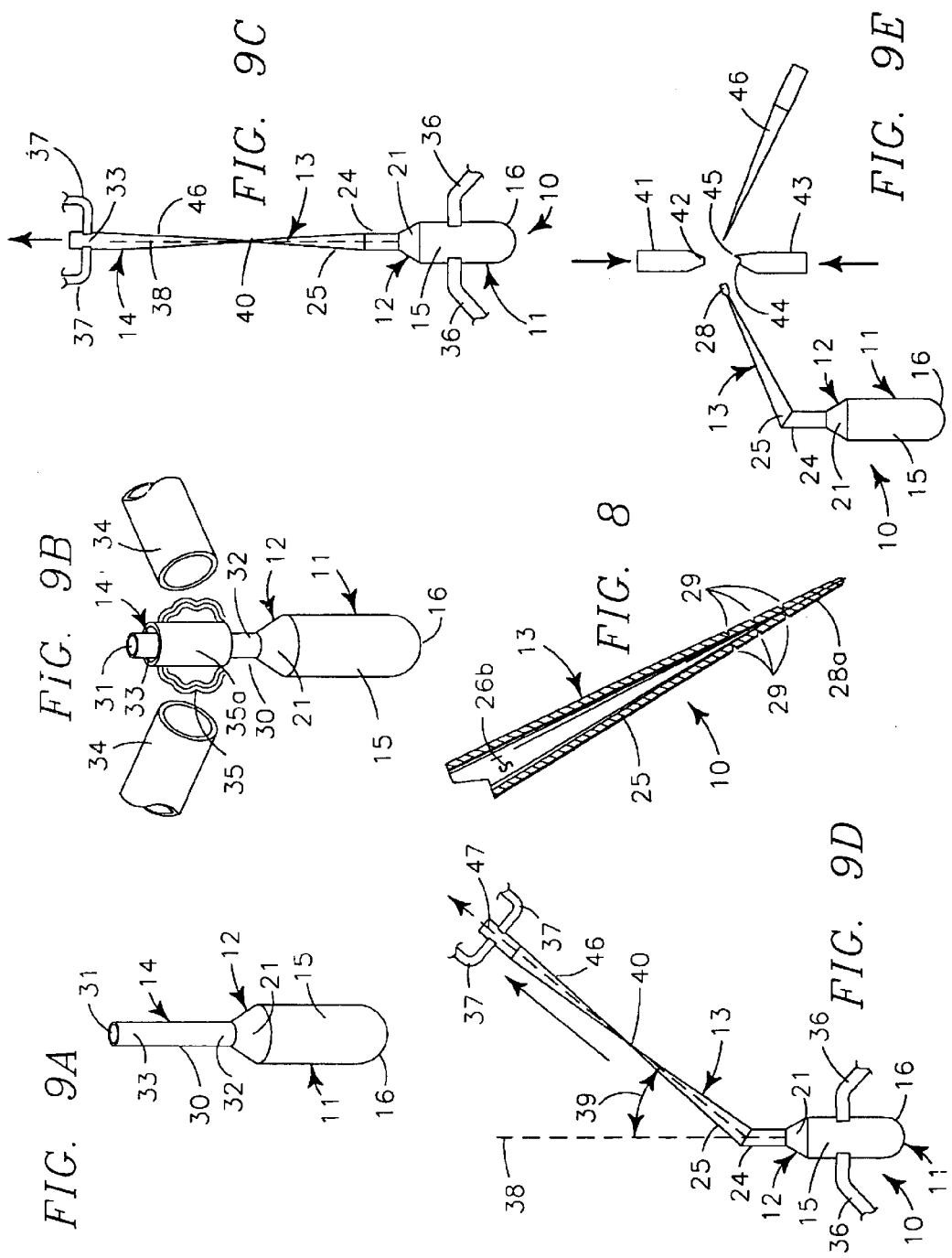

RESILIENT DISPERSING AMPULE AND PROCESS FOR FORMATION THEREOF

RELATED APPLICATIONS

U.S. Pat. No. Des. 347,277

This is a continuation in part of a prior application Ser. No. 09/268,330 filed Mar. 16, 1999 and now abandoned. There is a design U.S. Pat. No. Des. 347,277 relating hereto heretofore issued to the instant inventor.

BACKGROUND OF INVENTION

1. Field of Invention

This invention relates generally to sealed ampules for containment and dispersement of small premeasured quantities of extrusive material, and particularly to such ampules that are formed of resilient, configurationally sustaining thermoplastic polymeric material by a particular thermal process.

2. Background and Description of Prior Art

Ampules of various sorts have long been known and used for containing and dispersing smaller quantities of materials of a fluidic or somewhat fluidic nature. Such ampules in their early history were formed of rigid materials, commonly glass, with some frangible or otherwise openable or penetrable portion to allow dispersement of the contained material for use. The material carried in these early ampules generally was expressed by means of gravity and without any particular finesse, or else expression required the assistance of an auxiliary device such as a syringe with hollow needle, an applicator, a pipette or similar device that could enter the containment chamber. In the medical field syringes carrying needles were commonly used for this purpose because dispersed materials often were subsequently injected into the tissue of a patient and the needled syringe in this case served the double purpose of both dispersement of material from the ampule and injection. Such a syringe commonly was introduced into an ampule through a penetrable, resealable portion to allow use of only a part of the ampule content while leaving the remaining content in a semi-sealed and hopefully sterile condition.

As polymeric materials developed and became better known and more readily available, ampule-like packaging of extrudable materials including medicinals, chemicals and similar fluidic matter became common, especially in the form of flexible non-configurationally sustaining pouches commonly known as "pillow packs". While pillow pack structures have developed and maintain a share of the packaging market, the polymeric type of ampule generally has remained in the traditional and habitually familiar substantially rigid non-resilient form of prior ampules or else has had a complex and resultantly expensive structure. Neither type of polymeric ampules generally have provided fine control of either product dispersement or placement without the use of ancillary apparatus, though both types of ampules undoubtedly provide improvements over prior fully rigid ampules as the deformability of the polymeric ampules allows expulsion of contained material by manually exerted force on the periphery of the ampules which is more efficient and certain than gravity motivated dispersement, while the polymeric ampules still allow use with needled syringes.

The improvement in material expulsion, however, has generally not improved control of the expulsion process nor accurate placement or distribution of the expelled product. In the case of the pillow pack type container, the control factor is often less than with prior rigid structures as a pillow pack usually is severed in some fashion by an often haphazard process to create an orifice for product dispersement that removes control potential because of the random positioning, sizing and configuration of the orifice. Because of these difficulties with control over product expulsion and placement, neither the flexible pillow packs nor resilient ampules have come into common usage with many materials, and especially finer chemical substances, medicinals and the like, notwithstanding the general economic viability of the containers for such purposes.

The instant container provides a resiliently deformable but configurationally sustaining polymeric ampule that has a body reservoir carrying an angulated spout of outwardly tapering configuration to allow fine control of both product dispersement and placement, while yet maintaining benefits of prior resilient non-configurationally sustaining ampules that require use of syringe and pipette devices.

The reservoir body of the instant ampule is formed in a cylindrical configuration from relatively thin polymeric material that is sufficiently resilient to allow fine control of contained products dispersement by force exerted by a user's fingers, normally the thumb and index finger, while yet providing sufficient rigidity and retentive memory to maintain and regain its unstressed configuration to provide a structure well suited for grasping to aid manipulation. The generally cylindrical configuration of the reservoir body has a substantially larger cross-sectional area than the largest cross-sectional area of the tapered spout to aid product flow through the spout for expulsion of high viscosity fluids, viscous gels and similar materials having centipoise values in excess of three million. This ampule configuration provides hydraulic advantage of increased pressures as the material moves from larger diameter to small diameter channels. The hydraulic force must be sufficient to overcome increased friction of the material being expelled in the narrower channel where the frictional forces increase. This dispersement of viscous material through small channels requires careful and accurate design and configuration of both the lumen and spout walls defining it to allow the ampule to withstand pressures required to move material through the lumen without either body or spout rupture or substantial configurational change. This problem has not been well addressed or dealt with in prior resiliently deformable spouted ampules and its resolution distinguishes the instant ampule both structurally and functionally.

The cylindrical configuration of the reservoir body and its formation from configuratively sustaining, resiliently deformable polymeric material provide additional secondary benefits to further distinguish the instant ampule from prior devices. With this structure one or more frangible septa may be defined in the reservoir chamber to separate two or more products stored in that space so that the septa may be ruptured and the products admixed at the time of dispersement, should this be desired. The polymeric material may also provide a transparent or translucent reservoir body wall through which contained material may be observed before and during expulsion. For light sensitive materials the reservoir body material may be rendered opaque by additives or surface coatings on either inner or outer surfaces. The reservoir body material also may incorporate various photo-blocking and ultraviolet ray blocking material including pigments which may be chosen to block light in general or specific wave lengths of the light spectrum.

The spout of the ampule for economic viability must be formed of the same material as the ampule body, but yet must define an outwardly tapering structure, with a similarly configured outwardly tapering channel. The spout must be sufficiently rigid to be configurationally sustaining when viscous material moves therethrough to fulfill its purposes. The differential strength and rigidity is accomplished by regulating the thickness of various ampule portions, generally with the spout being somewhat thicker than the reservoir body to provide the desired physical characteristics.

The material from which the ampule is formed is a thermal plastic type polymer to allow formation of the ampule the configuration specified with required economic viability. The polymeric material must allow reasonable deformation and have sufficient coherence to allow pressurized expulsion of contained material and prevent rupture during the process. For practical utility the polymeric material must have resistance to common acids, bases, peroxides and organic compounds commonly packaged in ampules, while yet having a relatively low density to strength ratio, low thermal expansion and low permeability to gases. The polymer must have thermoplastic characteristics that provide plasticity sufficient for ampule formation in a lower temperature range with the plasticity varying somewhat directly with temperature over a substantial portion of that temperature range to allow use of the formation process disclosed.

The spout provides an outwardly tapering angulated structure with a geometrically similar outwardly tapering channel defined therethrough to a sealed outer end portion. The spout may be opened by severing at various positions to provide selective orifice size and shape. The outermost end portion of the spout generally defines a channel tapering to approximately 0.01 inch by a thermal forming process as herein disclosed and thought to be novel. The tip portion of the spout may be provided with a fitting for attachment of a needle or various ancillary devices for dispersement of extruded material such as a brush, a valve, a roller ball or other similar device, for specific dispersement uses. The tip portion of the spout may be formed with one or more severable portions to provide a tear-off type seal at one or multiple axially spaced positions.

In contradistinction to forming processes for prior polymeric ampules and packages, the instant ampule is formed by pulling a thermally activated tubular blank of thermal plastic material to obtain the tapering spout configuration defining the similar tapering channel. An ampule blank is formed with the reservoir body and transition structure interconnecting a cylindrically tubular spout blank. The spout blank is heated in its medial portion to increase thermal activity in that area and the outer end of the spout blank is mechanically pulled away from the inner end which interconnects with the transition structure. As this occurs the tubular spout blank is elongated in its more plastic heated portion. As the spout blank elongates it narrows in diameter while yet maintaining its circular annular cross-sectional configuration with a proportionately sized channel of circular cross-section defined herein. It has been found that the disclosed pulling process maintains the proportional size and configuration of the channel of the tube with great integrity to diametrical sizes of 0.01 inch or less. The tube during or after the pulling process may be angulated from the axis of the original spout blank and the outer end portion of the channel sealed. The rearward reservoir body end opposite the spout may be left open and sealed in its initial formation process or it may be sealed after formation of the spout and the sealing of the spout channel if it be desired to fill the ampule from the rearward end.

It is not known that the instant drawing process of thermally activated tubular thermal plastic material has been used in forming ampules having an outwardly tapering spout of the instant type. It has not been possible to develop a cold drawing process by which a spout of the tapering nature here described may be formed in such a polymeric ampule.

My invention resides not in any one of these features individually, but rather in the synergistic combination of all of its structures and processes that give rise to the functions flowing therefrom as specified and claimed herein.

SUMMARY OF INVENTION

The instant peripherally defined ampule provides a cylindrical reservoir body communicating by a medial transition portion with a cross-sectionally smaller outwardly tapering spout to define a containment chamber for extrudable materials. The reservoir body is resiliently deformable to allow exertion of pressure on material in the containment chamber to cause expression through the opened spout. The spout is of outwardly tapering configuration defining a geometrically similar outwardly tapering internal channel sealed in its outer end portion that may be severed for opening of the spout channel at selectable positions to define orifices of varying size and configuration. The spout is sufficiently rigid to maintain substantial configurational stability during extrusion of viscous material from the ampule, without rupture or deformation. The ampule is formed from a blank of thermal plastic material defining the reservoir body and medial transition portion with a cylindrical spout blank extending from the transition portion. The tapering spout is formed from the cylindrical spout blank by thermally activating the medial portion of the spout blank and pulling the outer end portion away from the inner end portion to create an outwardly tapering spout having an internal channel with a configuration geometrically similar to that of a spout. The outer end of the spout is sealed and optionally configured to aid spout opening. The ampule is filled with extrudable material before pulling or by closing the reservoir body end distal from the spout after formation of the tapered spout. The tapered spout may be angulated relative to the reservoir body, if desired, during the pulling process or thereafter by further thermal activation of the angle forming portion of the spout.

In providing such an ampule, it is:

A principal object to create a peripherally defined, configurationally sustaining but resiliently deformable polymeric ampule having a reservoir body communicating through a medial transition element with a tapering spout to define a similarly configured chamber for containment and extrusion of contained material.

A further object is to provide such an ampule that has a spout tapered in an outward direction, in either straight or angulated orientation, to define a medial channel similarly tapered with an outer end portion as small as 0.01 inch in diameter.

A further object is to provide such an ampule wherein the reservoir body has a substantially larger cross-sectional area than the channel defined in the spout to aid expression of viscous material and gels having centipoise valves in excess of three million.

A further object is to provide such an ampule that is formed by processing a molded blank of polymeric material that may have portions of varying thickness to form corresponding elements of similar varying thickness in the processed ampule.

A still further object is to provide such an ampule that is formed of thermal polymeric material so that the spout may be formed from an elongate tubular blank by thermally activating the medial portion of the blank to allow subsequent pulling of the outer end away from the inner end to form an inner tapering spout defining a geometrically similar tapering medial channel therein.

A still further object is to provide such an ampule that has a spout with a closed outer end portion severable at selected positions to define orifices of varying size and configuration.

A still further object is to provide such an ampule that is of new and novel design, of rugged and durable nature, of simple and economic manufacture and one otherwise well suited to the used and purposes for which it is intended.

Other and further objects of my ampule and its formation process will appear from the following specification and accompanying drawings which form a part hereof. In carrying out the objects of the invention, however, it is to be understood that its essential features and process are susceptible of change in design and arrangement, with only preferred and practical embodiments being illustrated and specified as is required, but the invention is not intended to be limited except as set forth in the claims herein.

BRIEF DESCRIPTION OF DRAWINGS

In the accompanying drawings which form a part hereof and wherein like numbers of reference refer to similar parts throughout:

FIG. 1 is an isometric rearward looking side view of an ampule having an angulated spout.

FIG. 2 is an isometric rearwardly looking view of an ampule having a straight spout.

FIG. 3 is an elongate vertical cross-sectional view through the ampule of FIG. 1, taken on the line 3—3 thereon in the direction indicated by the arrows.

FIG. 4 is a transverse vertical cross-sectional view through the body of the ampule of FIG. 1, taken on the line 4—4 thereon in the direction indicated by the arrows.

FIG. 5 is a partial orthographic top view of a form of ampule having a reservoir body with a sealable rearward end structure.

FIG. 6 is an elongate vertical cross-sectional view of the body end structure of FIG. 5, taken on the line 6—6 thereon in the direction indicated by the arrows.

FIG. 7 is a partial orthographic view of the ampule body of FIG. 1 having a holding tab extending from the hemispherical rearward end.

FIG. 8 is an enlarged view of the forward tip structure of the ampule of FIG. 3 showing in more detail the plural frangible portions.

FIGS. 9A–9E show somewhat diagrammatically the method of thermally forming the tapered spout of the ampule.

DESCRIPTION OF THE PREFERRED EMBODIMENT

Peripherally defined ampule 10 provides reservoir body 11 carrying at its forward end transition structure 12 that joins forwardly extending spout 13 to form an enclosed containment chamber. The ampule is formed from a precursor molded thermoplastic blank 14.

Reservoir body 11 is an elongate peripherally defined element formed by circular cylindrical tube 15 having closed rearward end 16, comprising a hemispherical structure, in the instance illustrated in FIGS. 1 and 2, to define containment chamber 17. The size of the cylindrical tube 15 may vary to provide a containment chamber 17 for predetermined volumes of material, but preferably the cylindrical tube maintains an elongate configuration with axial length greater than cross-sectional diameter to provide a handle-like structure that may be easily grasped for manipulating and squeezing to create pressure on material in the reservoir containment chamber for expulsion. The particular cylindrical configuration with a hemispherical rearward end is not essential and other shapes that define a closed containment chamber are within the ambit and scope of my invention, though they may not be so practical of either formation or use.

A form of rearward end structure that may be used to fill the ampule from the rearward body end is shown in FIGS. 5–6 where it is seen to be formed by two similar opposed angulated elements 18 joined in their overlapping adjacent rearwardmost portions 19 to form a closed end structure. The overlapping end portions 19a may extend a spaced distance rearwardly from the body end to create a tab which may be used to aid manipulation and grasping of the element. A somewhat similar tab 20, as seen in FIG. 7 may optionally be provided for the hemispherical rearward end of the body structure of FIGS. 1 and 2 as a grasping and manipulative aid.

Transition structure 12 provides connection between the forward end of the diametrically larger body 11 and the rearward end of diametrically smaller spout 13. In the instances illustrated, the transition structure comprises a peripherally defined truncated conic section having a larger rearward base diameter equal to the diameter of the body 15 and a smaller forward truncated diameter equal to the rearward diameter of the spout. By reason of the circularly symmetrical geometry of both body and spout in the illustrated embodiment, the transition element 21 takes the geometrical configuration of an axially aligned truncated right circular cone, but this configuration is not essential and other transition elements that fulfill the requirement for joining the respective ampule portions are within the ambit and scope of my invention. The transition element 12 is joined to both body 11 and spout 13 in a sealed structural manner, preferably by reason of unitary formation of the three elements, but otherwise by known plastic joining methods.

Tapered spout 13 in the species of FIGS. 1 and 2 provides circularly cylindrical rearward portion 24 structurally communicating with forwardly tapering outer conic portion 25. The spout is peripherally defined to provide internal channel 26, seen in FIGS. 3 and 8, communicating at its rearward orifice 27 with the transition structure orifice 23, and provides inner channel portion 26a and outer channel portion 26b of similar cross-sectional configuration to that of the spout portions in which these channels are defined. The forward tip portion of the spout is sealed, in the instance illustrated, preferably by tab-like element 28 which, if associated with an immediately rearwardly adjacent frangible portion 29, may be used for manual manipulation to open the tip channel for expression of material contained in the ampule.

The spout 13 is structurally interconnected with the transition structure 12 about orifice 23 and the rearward cylindrical portion 24 of the spout and forward tapering portion 25 are structurally interconnected, all preferably by formation as a unitary structure, but if not then by known plastic joining methods. For effective distribution and fine positional placement of small quantities of contained materials, the outer portion 26b of the spout channel 26 should taper substantially to a point in its outermost end portion. This requirement has presented problems in formation and manufacture of the instant ampule in any practically efficient and economically viable fashion. It has been learned through research required to deal with the problem that tubular blanks formed by molding thermoplastic materials, and particularly polyethylene and polypropylene plastics, may be thermally activated to temperatures at or above vicat temperatures to increase their plasticity. During this state of increased plasticity tubes of these plastics may be drawn in an axial direction away from a thermally activated area to create a structure of tapering conic configuration. With such thermal plastics of homogenous nature and circular cross-section, it has been found that this drawing process allows formation of tapering spout structures having walls that may vary somewhat proportionally to the cross-sectional diameter, depending on pulling temperatures and conditions, while yet retaining the original circular cross-sectional configuration of the lumen.

The cold drawing of polyolefin type plastics in the form of tubes has heretofore been known as described in U.S. Pat. No. 4,212,204 issued to Elmer F. St. Amand on Jul. 15, 1980, especially in Columns 3–6. In that cold drawing process a larger diameter tube collapses at its weakest annulus between the opposed pulling forces and the collapse continues progressively in one or both directions so long as the pulling forces continue, to form a new smaller tube of approximately 50–70 percent of the diameter of the original larger tube, depending on the nature of the plastic being drawn and the thickness of the original tube wall. The smaller drawn tube will have a cross-section substantially geometrically similar to the larger original tube, especially if the original tube has a circularly annular cross-section of substantial axial uniformity.

In the cold drawing process the larger original tube collapses over a very short axial distance, not much if any greater than the thickness of the original tube. The smaller drawn tube will be of substantially the same diametrical size and cross-sectional configuration throughout its length so long as the larger tube is uniform in thickness throughout its length. This cold drawing process as described occurs in a range of ambient and material temperatures of from about 40° F. to 120° F., and will not occur at substantially lower or higher temperatures, which respectively will beget other configurations of a tube sought to be drawn, if drawing is possible.

In contradistinction the instant thermal spout drawing process is carried out by thermally activating a medial portion of a tubular blank of polyolefin type plastic of appropriate size and wall thickness and drawing portions of the blank on both sides of the thermally activated area in an axially elongate direction away from each other until a tapering spout of the desired configuration is obtained. As the tapering blank is drawn, it will form a structure geometrically similar to the surface of two steeply tapering cones interconnected at their apices with each cone still retaining its interior channel, the cross-sectional area and configuration of which will remain similar to the cross-sectional area and configuration of the tube defining the channel, as seen in FIG. 9C. The instant thermal drawing process is carried out in the range of the vicat softening temperature of the polyolefin type plastic involved, and particularly with polyethylene and polypropylene. The vicat softening temperatures of commercial forms of various of these plastics is in the 220° F. range (ASTM test method D1525) and the instant thermal drawing process that produces long tapered drawn portions is operative, at least to some degree, in a temperature range of from approximately 180° F. to 300° F., depending on the molecular configuration of the particular polymer. The process has been found operative with low density, linear low density and high density polyethylene materials available in the present day marketplace and with homopolymer and copolymer blow molding grades of polypropylene presently commercially available.

The instant thermal drawing process provides an additional benefit in allowing the formation of an angulated spout as the thermal activity created in the spout blank increases plasticity of the material sufficiently to allow bending or angulation of the drawn portion of the blank relative to the inner undrawn portion. Preferably any spout angulation is created after the drawing of the tubular blank to its conical configuration to lessen or nullify the probability of any channel collapse at the bend. It has been found in forming an angulated portion in the forward part of the spout in the instant thermal drawing process that the angulated area substantially maintains the configurational integrity of the lumen and does not appreciably change the cross-sectional area or shape of the lumen in the bend. Undoubtedly the material conditions that allow this bending process are similar to those that allow drawing of the thermally activated blank, but the process probably is aided to some degree by the potential plastic flow of material as allowed by its thermal activation.

The spout forming process also allows sealing of the forward outer end portion by use of pressure applied thereto during the thermally activated state of the material to form a tab-like seal either after or before the outer unused portion of the blank is severed and removed.

The drawing process can be seen in more detail with reference to FIGS. 9A–9E. As seen in FIG. 9A ampule blank structure 14, that is pre-formed from a thermal plastic of the polyolefin group generally blow molding, provides tubular spout blank 30 structurally joined with the smaller truncated portion of the transition structure 12. The body 11 and transition structure 12 are molded in their structurally joined final form that is to exist in the completed ampule, with appropriate dimensioning and configuration as specified. The spout blank 30 is a right circularly cylindrical tube defining geometrically similarly configured medial channel 31 extending axially therethrough to communicate with the orifice 23 of the channel defined by truncated conic element 21 of the transition structure 12. The axial length of the spout blank 30 is longer than the tapered spout to be created therefrom because the outer end portion will be trimmed and wasted. The thickness of the cross-sectional annulus of the spout blank 30 is determined empirically by experimentation to provide a pulled spout of the size and configuration desired and that thickness is not necessarily the same as, or even necessarily dictated by, the thickness of either body 11 or transition portion 12 of the ampule.

As seen in FIG. 9B, the medial portion of spout blank 30 is heated by external heating source 34. The heating source 34 may be of various known types so long as it creates a heated envelope 35 of some thermal homogeneity about the periphery of the medial portion of the spout blank without substantially heating either inner end 32 or outer end 33 beyond the portion to be drawn. The axial length of the heating zone along the spout blank 30, as well as the temperature gradation through the heating zone, may be selectively determined to create varying configurations of the drawn spout, but normally the zone comprises approximately the middle one-half of the spout blank and any additional spout material that angulation will require at the rearward inner boundary of the heated envelope. For the preferred circularly symmetrical drawn shape of the spout, the radial and circumferential distribution of heat throughout the heating zone should be substantially homogeneous. Though heating zones with differing axial temperature zones may be used, they generally will produce spouts of non-uniform drawn shapes, as the cooler zones will not create as great plasticity in the spout blank as the hotter zones to create non-conical drawing characteristics.

Preferably heating is accomplished by radially spaced, electrically powered heating elements providing both radiant and conductive heat, but other types of heating such as by conduction, pure convection created by gas combustion as illustrated, or otherwise are within the ambit and scope of my process. If combustion heating is used it is helpful to use a tubular heat transfer shield 35a to create a more uniform heat envelope about the area of the spout to be heated. The temperature range required for most thermal plastics used in my process requires a material temperature of approximately 220° F. to 230° F. which will require a thermal envelope of somewhat greater temperature with convention heating to accommodate for heat loss inherent in the heating process a thermal envelope may vary considerably with the method and time of heating, the nature and amount of thermal envelope containment, the ambient temperature and the nature of the thermal plastic material used. This temperature range must be determined in a particular instance with particular materials by known engineering methods, empirically, by experimentation, or by a combination thereof.

To form a spout, as seen in FIG. 9C, the ampule blank structure 14 is preferably removed from the heating envelope and is supported by its body 11 in body support 36 carried on a stationary object (not shown). The outer end 33 of the thermally activated spout blank 30 is grasped in tip support 37 and drawn, preferably in a direction along axis 38 of the spout blank 30. The drawing of the spout blank structure is carried out shortly after thermally activating the ampule blank in the heating envelope to the predetermined material temperature, and may be carried out within the heating envelope or in an unheated drawing zone shown in FIG. 9C. The speed of the tip blank drawing may vary to accommodate other related parameters, but normally is carried out fairly rapidly after thermal activation of the ampule blank to accomplish the process during the period appropriate of plasticity and before substantial amounts of plasticity in the blank are lost if drawing is outside the heating zone or too much plasticity created if drawing is within the heating zone.

During or preferably after the drawing process the forward outer end portion 25 of the spout is angulated relative to the rearward inner portion 24, if this configuration be desired. Angulation at included angle 39 with the axis 38 of the inner spout portion 24 is accomplished by moving the tip support 37 so as to rest upon or move along angulated spout axis 47 as seen in FIG. 9D. If the angulation of the outer spout portion 25 is carried out too soon in the drawing process, it possibly could cause collapse or deformation of the spout channel in the area of angulation. If required, the area of angulation may be thermally reactivated in the heating envelope 35 or another external heat source (not shown) to increase material plasticity to allow proper angulating. The ampule blank is moved from the heating envelope immediately after drawing and angulation, if any, to preserve the then existing configuration, with support if necessary until the configuration is self sustaining.

The various parameters associated with the drawing process must be predetermined in individual instances by known theory, experimentally, empirically or a combination of these methods. Generally with most thermal plastic materials, a small difference in temperature will cause change of plasticity in a short period of time and if the drawing or angulating processes are carried out at ambient temperatures of approximately 70 F. outside the heating envelope, the spout will be rigid enough to be configurationally sustaining as against gravity shortly after execution of the drawing process, but support may have to be maintained for a short time to allow sufficient cooling to sustain the drawn configuration.

As seen in FIG. 9E, outer end portion 46 of the drawn spout blank 30, outwardly of the medial part of the drawn area 40 that has the smallest diameter, is severed from the forward end portion 25 of the spout 13 and wasted. This severance, the sealing of the forward end portion of the spout, and the creation of tab 28 thereat, if desired, is preferably accomplished by a pressing operation during a period of somewhat reduced but still existent thermal activation. Upper pressing tool 41 having flat end portion 42 is moved to interfit with adjacent tip of lower pressing tool 43 having cooperative interfitting flat portion 44 to create a seal in the channel of the spout between the pressing elements. The lower pressing tool defines upwardly extending parting edge 45 to fit adjacent the surface of the upper pressing tool 41 so that when the two tools are brought into adjacency the wasted portion 46 of the drawn spout blank will be severed. If the thermal plastic material has cooled sufficiently to prevent sealing of adjacent surfaces by pressure at the time sealing is attempted, the material may be thermally activated again in an appropriate heating envelope or by heating one or both of the pressing tools 41, 44 to cause an appropriate seal.

If a frangible type tab 28a is desired, the opposed faces of the upper and lower pressing tools may be appropriately configured with surface features (not shown) such as opposed ridges, teeth or the like to create indented portions 29 in or rearwardly of the tab 28 that allow the tab to be more easily manually severed as heretofore known in the plastic arts.

The ampule described may be filled with extrusive material at various stages of the ampule forming process. Normally the ampule illustrated in FIGS. 1–4 is filled in the molded blank state before thermally activating the spout of the blank for drawing and the contained fluidic material is then sealed in the ampule by sealing the ampule tip structure 28 during its formation. The ampule may be either completely or partially filled with extrusive fluidic material, but commonly it will be partially filled so that a gaseous volume remains in the containment chamber to provide some compressibility which tends to make the expulsion process for the contained non-compressible fluidic material more simple, uniform and accurate.

It is possible that the ampule may be completely formed and product to be contained subsequently introduced by injection into the containment chamber with a needled syringe or similar device. This procedure, however, normally is not so desirable nor efficient as it is difficult to inject material into the containment chamber because of pressurizing the gas contained in the chamber if the chamber is not ventilated and it also is necessary to seal the orifice or orifices after filling.

In some instances, it may be desirable to fill the ampule through the rearward body end after formation of the spout. A particular body end structure for such purpose is shown in FIGS. 5–6 where it is seen to provide similar opposed end structures 18, 19, each sloping inwardly to a medial line therebetween to meet in linear adjacency where the two adjacent portions 19 of the end structures may be sealed to each other by thermal, adhesive or other known processes. The end portions 19 may have sufficient length to extend spacedly rearwardly beyond the initial point of their joinder to form tab 19a to aid manipulation of the ampule.

The detailed dimensioning and configuration of the various portions of the ampule are not critical nor essential and may vary within limits, so long as the relative proportions specified that define the essential elements of the ampule and their relationships are maintained. Generally, however, the ampule is designed for single use quantities of contained products and this usually requires a containment chamber having a volume of from approximately 0.1 to 5.0 cubic centimeters, though the design may be extended above and below these limits and remain within the ambit and scope of my invention. The ampule is particularly adaptable for encapsulation of medicaments and chemicals of various sorts, though it finds economically viable use in dispersement of smaller quantities of many industrial and commercial products that require the benefits provided by it.

A specific example of the parameters concerned with the manufacture of a 2.0 cubic centimeter ampule for containment of extrusive dental medicaments follows:

SPECIFIC EXAMPLE

An ampule blank of the configuration specified and illustrated in FIG. 9A was formed by blow molding, with a body having an axial length of 2.5 centimeters, a diameter of 1.2 centimeters and a thickness of 0.05 centimeters that interconnected a transition element having an axial length of 0.5 centimeters. The interconnected spout blank had an axial length of 3.3 centimeters, a diameter of 0.5 centimeters and a thickness of 0.15 centimeters. The interior chamber defined by this blank had a volume of somewhat more than 2.0 cc.

The blank was formed of thermal plastic material comprising a low density polyethylene produced by Eastman Kodak Company. This material is known as Tenite™ low density polyethylene E6838-796F having a melt index of 2.5 g/10 min., a density of 0.921 g/cm$^3$ and a vicat softening temperature of 201° F. (94° C.). The same process has been successfully carried out to form ampules with the same parameters using other polyethylene and polypropylene plastics of nondescript types having similar characteristics that are available in the present day marketplace.

The ampule was filled through the spout blank channel with 2.0 c$^3$ of extrusive material which it was to ultimately contain. The containment space defined by the ampule was somewhat larger which left a smaller volume of gas in the ultimately sealed ampule to provide some compressibility to aid extrusion of the product from the ampule. This gas comprised the ambient atmosphere, but if necessary for contained product compatibility the gaseous material may comprise any specialized gas. If a specialized gas is used, however, the ampule processing must be carried out in an enclosed environment or the ampule filled and sealed in an enclosed environment after formation.

The blank was supported in heating zone 35, shown in FIG. 9B. The heating zone comprised a tubular element having an annular cross-sectional configuration with an internal diameter of 1.0 centimeter and a thermally active axial length of 1 centimeter. The ampule blank was positioned with the spout blank 14 concentrically positioned within the tubular heating element and with the end portions of the spout blank extending approximately equally from either end thereof. The heating element was electrically powered and provided a temperature at its inner surface of substantially 350° F. with an ambient atmospheric temperature thereabout of substantially 70° F. The ampule blank remained in this position and environment for approximately twenty seconds until the medial portion of the spout blank became sufficiently thermally activated to allow drawing, but yet maintain configurational integrity.

The ampule blank then was supported by its reservoir body in support 36 and the outer end portion of the spout blank gripped by support 37. The support 37 then was moved, as illustrated in FIG. 9C, away from the support 36 while maintaining the medial portion of the spout blank within the heating zone 35 and the configuration illustration in FIG. 9C was obtained with the spout having conically tapering outer forward portion 25 and outwardly extending wasted portion 46. The drawing process was carried out at a uniform speed over a period of approximately two seconds. Upon completion of the drawing, the drawn spout blank was removed from the heating zone 35.

The drawn spout blank then was pressed in its medial smallest cross-sectional area 40 between upper pressing tool 41 and lower pressing tool 43 to seal the ampule chamber, form tab 28 and sever wasted portion 46, as illustrated in FIG. 9E. This process required approximately fifteen seconds and at that point the thermally activated portion of the spout blank was fully configurationally sustaining and the contents of the ampule were sealed in the chamber defined thereby.

The angulated spout ampule of FIG. 9D was formed with the same ampule blank and the same processing as described, to the point of drawing the spout. In this instance after thermally activating the spout blank and engaging supports 36 and 37 thereon as described, the support 37 was moved from its position in alignment with axis 38 to the position illustrated in alignment with axis 47, while maintaining support but non-extensive tension between supports 36 and 37. This caused the spout blank to bend substantially at the rearward point between the forward thermally activated area and the rearward non-thermally activated area of the spout blank. The spout blank then was drawn by moving the tip support 37 along the axis 47 until the desired tapered configuration of the spout was created. The processing of the ampule thereafter in sealing and severing the wasted outer portion 46 was the same as previously described.

It is to be noted from the foregoing specification that the polymeric materials from which my ampule is formed are generally quite easily severable and the outer end of the spout may be severed by ordinary cutting tools such as knives or scissors at different positions along its axis to create extrusion orifices of varying sizes for various products and application processes. It is also to be noted that such orifices may be severed in various fashions to provide orifices of different non-circular configurations and if desired, various applicator devices may be associated with the tip, either as part of its structure or as auxiliary structures, to aid the application of dispersed material.

It is further to be noted that, since that ampule is formed of thermal plastic material, after dispersement of contained product the dispersement orifice may be resealed by thermally activating the area so that any residue of originally contained product that might be a hazard or danger to the environment or its occupants is contained in the used ampule. This thermal activation may be accomplished by application of heated tools or an open flame, usually with some pressure during the thermally active stage.

It is still further to be noted that, by reason of the material of formation, expended ampules may be easily destroyed or their material recycled and reclaimed by thermal processing that presents no particular environmental hazards or contamination.

The foregoing description of my intention is necessarily of a detailed nature so that specific embodiments of it might be set forth as required, but it is to be understood that various modifications of detail and rearrangement and multiplication of elements and processes might be resorted to without departing from its spirit, essence or scope.

Having thusly described my invention, what I desire to protect by Letters Patent, and

What I claim is:

1. A peripherally defined, resiliently deformable, thermal plastic ampule for containment and dispersement of extrudable material, comprising in combination:
   a peripherally defined elongate right circular cylindrical reservoir body, having a first closed rearward end and a second open forward end to define a cavity, the reservoir body structurally carrying at the second open end
   a truncated conic transition element having forward and rearward ends and defining a geometrically similar channel extending therethrough with the areally larger rearward end structurally joined with the forward end of the body and the areally smaller forward end defining a spout orifice structurally carrying
   an elongate forwardly extending spout, having a cylindrical rearward portion and a continuously tapering forward portion with the rearward portion structurally carried by the forward end of the transition element, said spout defining a geometrically similar medial channel continuously tapering to a point at the forward end with the rearward portion of the channel communicating with the spout orifice of the transition element and the forward end of the channel closed to form an enclosed containment chamber in the ampule.

2. The ampule of claim 1 having a right circularly cylindrical reservoir body with a hemispherical rearward end, a truncated right conical transition element, and a spout with a rearward circularly cylindrical portion and a forward conical tapering portion with the axes of the reservoir body, the transition element and the spout portions all in axial alignment.

3. The ampule of claim 1 having a circularly cylindrical reservoir body with a hemispherical rearward end and a truncated right conical transition element each having aligned axes and
   a spout having a rearward circularly cylindrical portion with a rearward axis aligned with the axes of the body and the transition element and a continuously forwardly tapering forward conical portion having a forward axis angulated to the rearward axis.

4. The ampule of claim 1 wherein the rearward end of the reservoir body is formed by two similar opposed end structures extending toward each other to meet in sealed adjacency to allow ampule filling and sealing after spout formation.

5. A peripherally defined, resiliently deformable, thermal plastic ampule for containment and dispersement of extrudable material, comprising in combination:
   a peripherally defined elongate right circular cylindrical reservoir body, having a first closed rearward end and a second open forward end to define a cavity, the reservoir body structurally carrying at the second open end
   a truncated conic transition element having forward and rearward ends and defining a geometrically similar channel extending therethrough with the areally larger rearward end structurally joined with the forward end of the body and the areally smaller forward end defining a spout orifice structurally carrying
   an elongate forwardly extending spout, having a cylindrical rearward portion and a continuously tapering forward portion with the rearward portion structurally carried by the forward end of the transition element, said spout defining a geometrically similar medial channel continuously tapering to a point at the forward end with the rearward portion of the channel communicating with the spout orifice of the transition element and the forward end of the channel closed to form an enclosed containment chamber in the ampule, said spout having a tab-like element extending forwardly of the closed forward portion of the spout to aid manipulation for opening the forward portion of the spout and
   a plurality of axially spaced frangible areas defined in the forward portion of the spout rearwardly of the closed end portion to aid severance of a spout portion forwardly of the frangible area for manual opening of the channel defined in the spout.

6. A process for forming a resiliently deformable, peripherally defined ampule from thermal plastics, said ampule having a rearward elongate reservoir body defining an elongate axis therethrough and structurally carrying an axially aligned forwardly extending tubular transition element which structurally carries a forwardly extending and continuously forwardly tapering spout defining a channel tapering to a point to define a containment chamber in the ampule, comprising the steps of:
   a) forming an ampule blank defining the reservoir body structurally interconnecting the axially aligned transition element which structurally interconnects an axially aligned elongate circularly cylindrical tubular spout blank, defining a geometrically similar circularly cylindrical medial channel communicating with the containment chamber defined in the reservoir body and transition element and having an outer portion extending forwardly from the transition element;
   b) heating an axially medial portion of the spout blank at least to substantially its vicat softening temperature to thermally activate semi-plasticity in the heated portion to allow continuously tapered drawing while maintaining the tubular configuration of the drawn portion of the spout blank;
   c) supporting the reservoir body and drawing the portion of the spout blank forwardly of the heated portion away from the reservoir body to form a forwardly tapering spout from the spout blank portion rearward of the heated portion with the tapering spout having a geometrically similar channel tapering forwardly to a point;
   d) supporting and cooling the drawn spout until it is configurationally self-sustaining; and
   e) severing the portion of the spout blank forwardly of the forward point of the tapering channel.

7. The process of claim 6 wherein
   the thermal plastic from which the ampule is formed is one of the group consisting of low density, linear low density and high density polyetheylene and homopolymer and copolymere molding grades of polypropylene.

8. The process of claim 6 further including the steps of
   forming the ampule blank with a reservoir body having an enclosed rearward end and placing extrudable material that is to be enclosed in the completed ampule in the ampule blank before sealing.

9. The process of claim 6 further including the steps of forming the ampule blank with a reservoir body having an open rearward end with structure to allow subsequent closure, placing extrudable material in the ampule through the open rearward end after completion of ampule formation and closing the rearward end of the reservoir body.

10. The process of claim 6 further including the additional steps of supporting the reservoir body carrying the thermally activated spout blank and angulating the forward portion of the spout blank, forwardly of the medial portion of the thermally activated area from the first axis of the spout blank to a second axis angulated to the first axis and drawing the portion of the spout blank forwardly of the thermally activated area, away from the reservoir body and along the second axis to form the tapered spout.

11. A process for forming a resiliently deformable, peripherally defined ampule from thermal plastics, said ampule having a rearward elongate reservoir body defining an elongate axis therethrough and structurally carrying an axially aligned forwardly extending tubular transition element which structurally carries a forwardly extending and continuously forwardly tapering spout defining a channel tapering to a point to define a containment chamber in the ampule, comprising the steps of:

a) forming an ampule blank defining the reservoir body structurally interconnecting the axially aligned transition element which structurally interconnects an axially aligned elongate circularly cylindrical tubular spout blank, defining a geometrically similar circularly cylindrical medial channel communicating with the containment chamber defined in the reservoir body and transition element and having an outer portion extending forwardly from the transition element;

b) heating an axially medial portion of the spout blank at least to substantially its vicat softening temperature to thermally activate semi-plasticity in the heated portion to allow continuously tapered drawing while maintaining the tubular configuration of the drawn portion of the spout blank;

c) supporting the reservoir body and drawing the portion of the spout blank forwardly of the heated portion away from the reservoir body to form a forwardly tapering spout from the spout blank portion rearward of the heated portion with the tapering spout having a geometrically similar channel tapering forwardly to a point;

d) forming a plurality of axially spaced indentation areas in the spout blank spacedly rearward of the outer end portion to aid severance of the spout at a selected indentation area, and e) forming an immediately adjacent tab in the spout blank portion forwardly of the outer end portion to aid manual manipulation to sever the spout blank portion forwardly of the selected indentation to open the containment chamber of the ampule, f) supporting and cooling the drawn spout until it is configurationally self-sustaining; and g) severing the portion of the spout blank forwardly of the forward point of the tapering channel.

12. In a process for forming a tapered angulated spout, defining a geometrically similar spout channel therein, on a peripherally defined resiliently deformable thermal plastic ampule having a rearward elongate cylindrical reservoir body defining a containment chamber and structurally carrying a forward truncated conic transition structure, defining a channel therethrough communicating with the reservoir body containment chamber and structurally carrying the tapered spout extending forwardly from the transition structure with the spout channel communicating with the channel of the transition structure, the method comprising the steps of:

forming an ampule blank of thermal plastic material; of the group consisting of low density, linear low density and high density polyetheylene and homopolymer and copolymere molding grades of polypropylene;

defining the reservoir body and transition structure with a circularly cylindrical tubular spout blank, defining a geometrically similar axially aligned medial channel therethrough, extending forwardly from structural support on the transition structure;

heating the axially medial portion of the spout blank at least substantially to its vicat softening temperature to thermally activate semi-plasticity in the heated portion of the spout blank to allow continuously tapered drawing while maintaining the tubular configurational stability of the spout blank;

supporting the reservoir body and drawing the spout blank end portion forwardly of the thermally activated portion away from the reservoir body to form a continuously forwardly tapering right circular conic spout defining a geometrically similar axially aligned channel therein from the spout blank portion rearward of the thermally activated portion;

supporting and cooling at least the forwardly tapering spout blank portion until it is configurationally self-sustaining; and severing the portion of the spout blank forwardly of the apex of the forwardly tapering portion.

13. The process of claim 12 further including the additional steps of supporting the reservoir body of the thermally activated spout blank and angulating the forward portion of the spout blank, between the transition element and the medial portion of the thermally activated area from a first axis of the spout blank to a second axis angulated to the first axis; and drawing the portion of the spout blank forwardly of the thermally activated area away from the reservoir body and along the second axis to form an angulated tapered spout.

14. The process of claim 12 further including the additional steps of forming a plurality of axially spaced indentation areas in the forwardly tapering conical spout blank spacedly rearward of the apex portion to aid severance of the spout blank at a selected indentation area and forming an immediately adjacent tab in the spout blank portion forwardly of the apex portion of the forwardly tapering spout to aid manual manipulation to sever the spout blank portion forwardly of the selected indentation area to open the containment chamber of the ampule.

15. In a process for forming a tapered angulated spout, defining a geometrically similar spout channel therein, on a peripherally defined resiliently deformable thermal plastic ampule having a rearward elongate cylindrical reservoir body defining a containment chamber and structurally carrying a forward truncated conic transition structure, defining a channel therethrough communicating with the reservoir body containment chamber and structurally carrying the tapered spout extending forwardly from the transition structure with the spout channel communicating with the channel of the transition structure, the method comprising the steps of:

forming an ampule blank of thermal plastic material; of the group consisting of low density, linear low density and high density polyetheylene and homopolymer and copolymere molding grades of polypropylene;

defining the reservoir body and transition structure with a circularly cylindrical tubular spout blank, defining a geometrically similar axially aligned medial channel therethrough, extending forwardly from structural support on the transition structure;

heating the axially medial portion of the spout blank at least substantially to its vicat softening temperature between approximately 200° F. and 300° F. to thermally activate semi-plasticity in the heated portion of the spout blank to allow continuously tapered drawing while maintaining the tubular configurational stability of the spout blank;

supporting the reservoir body and drawing the spout blank end portion forwardly of the thermally activated portion away from the reservoir body to form a continuously forwardly tapering right circular conic spout defining a geometrically similar axially aligned channel therein from the spout blank portion rearward of the thermally activated portion;

supporting and cooling at least the forwardly tapering spout blank portion until it is configurationally self-sustaining; and severing the portion of the spout blank forwardly of the apex of the forwardly tapering portion.

16. A process for forming a resiliently deformable, peripherally defined ampule from thermal plastics, said ampule having a rearward elongate reservoir body defining an elongate axis therethrough and structurally carrying an axially aligned forwardly extending tubular transition element which structurally carries a forwardly extending and continuously forwardly tapering spout defining a channel tapering to a point to define a containment chamber in the ampule, comprising the steps of:

a) forming an ampule blank defining the reservoir body structurally interconnecting the axially aligned transition element which structurally interconnects an axially aligned elongate circularly cylindrical tubular spout blank, defining a geometrically similar circularly cylindrical medial channel communicating with the containment chamber defined in the reservoir body and transition element and having an outer portion extending forwardly from the transition element;

b) heating an axially medial portion of the spout blank at least to substantially its vicat softening temperature between approximately 200° F. and 300° F. to thermally activate semi-plasticity in the heated portion to allow continuously tapered drawing while maintaining the tubular configuration of the drawn portion of the spout blank;

c) supporting the reservoir body and drawing the portion of the spout blank forwardly of the heated portion away from the reservoir body to form a forwardly tapering spout from the spout blank portion rearward of the heated portion with the tapering spout having a geometrically similar channel tapering forwardly to a point;

d) supporting and cooling the drawn spout until it is configurationally self-sustaining; and e) severing the portion of the spout blank forwardly of the forward point of the tapering channel.

\* \* \* \* \*